United States Patent
Sano et al.

(10) Patent No.: US 7,106,924 B2
(45) Date of Patent: Sep. 12, 2006

(54) OPTICAL SWITCHING DEVICE AND OPTICAL TRANSMISSION SYSTEM

(75) Inventors: Tomomi Sano, Yokohama (JP); Michiko Takushima, Yokohama (JP); Makoto Katayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 65 days.

(21) Appl. No.: 10/743,329

(22) Filed: Dec. 23, 2003

(65) Prior Publication Data

US 2004/0190815 A1    Sep. 30, 2004

Related U.S. Application Data

(60) Provisional application No. 60/436,457, filed on Dec. 27, 2002.

(30) Foreign Application Priority Data

Dec. 24, 2002   (JP) .............................. P2002-372575

(51) Int. Cl.
   *G02B 6/35*   (2006.01)
   *G02B 6/36*   (2006.01)
   *G02B 6/42*   (2006.01)

(52) U.S. Cl. .............................. 385/16; 385/18; 385/39

(58) Field of Classification Search .................. 385/16, 385/18, 14–15, 19–23, 12; 216/24, 2; 257/415
See application file for complete search history.

(56) References Cited

U.S. PATENT DOCUMENTS 6,512,863 B1 *   1/2003   Lewis ........................ 385/18
6,632,374 B1 *   10/2003  Rosa et al. .................. 216/24
6,647,164 B1 *   11/2003  Weaver et al. ............... 385/16
6,711,321 B1 *   3/2004   Helin et al. .................. 385/19

OTHER PUBLICATIONS

D.M. Marom et al., OFC 2002 Postdeadline Papers, FB7-1, "Wavelength-selective 1×4 switch for 128 WDM channels at 50 GHz spacing".

* cited by examiner

*Primary Examiner*—Frank G Font
*Assistant Examiner*—Michael P. Mooney
(74) *Attorney, Agent, or Firm*—McDermott Will & Emery LLP

(57) ABSTRACT

[Problems to be solved] To provide an optical switching device which can switch between input/output optical paths of input/output ports while suppressing the influence on optical signals passing through other input/output ports.

[Means to solve problems] An optical switching device comprises an optical switch array 6 for switching between input/output paths of a plurality of input/output optical fibers. The optical switch array 6 comprises a substrate 8, on which a cantilever 11 is supported. A part of the cantilever 11 on the leading end side is provided with an annular support 12, which supports a movable mirror 7 inclinably. The movable mirror 7 reflects an optical signal from any of the input/output optical fibers toward another input/output optical fiber. The leading end of the cantilever 11 is provided with a comb part 14. Arranged on the upper face of the substrate 8 are electrode 15*a*, 15*b* for tilting the movable mirror 7 with respect to the annular support 12 and an electrode 16 for moving the movable mirror 7 in the direction different from the tilting direction of the movable mirror 7.

9 Claims, 8 Drawing Sheets

OPTICAL SWITCHING DEVICE AND OPTICAL TRANSMISSION SYSTEM

CROSS-REFERENCE TO RELATED APPLICATION

This application claims priority to Provisional Application Ser. No. 60/436,457 filed on Dec. 27, 2002 which is hereby incorporated by reference in its entirety.

BACKGROUND OF THE INVENTION

1. Field of the Invention

The present invention relates to an optical switching device and optical transmission system used in wavelength division multiplexing (WDM) optical communications and the like.

2. Related Background Art

An example of optical switching device used in WDM optical communication systems is a wavelength-selective switch disclosed in Document 1, i.e., OFC 2002 Postdeadline Papers, FB7-1, "Wavelength-selective 1×4 switch for 128 WDM channels at 50 GHz spacing". This wavelength-selective switch comprises a plurality of I/O ports, each constituted by an optical fiber and a lens, a diffraction grating, and a MEMS mirror which are combined together, thereby making it possible to attain a smaller size and a lower cost.

SUMMARY OF THE INVENTION

However, the following problem exists in the prior art mentioned above. Namely, since the MEMS mirror is driven only in directions for switching between input/output optical paths of input/output ports, optical signals reflected by the MEMS mirror when switching between the input/output optical paths of input/output ports may traverse their adjacent input/output ports. In this case, unnecessary light may enter the latter input/output ports, thereby deteriorating the transmission quality of optical signals passing therethrough.

It is an object of the present invention to provide an optical switching device and optical transmission system which can switch between input/output optical paths of input/output ports while suppressing the influence on optical signals passing through other input/output ports.

The optical switching device in accordance with the present invention comprises a plurality of input/output ports for inputting/outputting optical signals, and switching means for switching between input/output optical paths of the input/output ports. The switching means switches between the input/output optical paths of the input/output ports so as to keep an optical signal led to any of the plurality of input/output ports from traversing other input/output ports.

Since this optical switching device is configured such that, when switching between input/output optical paths of input/output optical ports, an optical signal does not traverse other input/output ports which are not subjected to switching, light leaking to the other input/output ports is reduced, whereby influences on optical signals passing therethrough can be alleviated.

Preferably, the switching means comprises an optical member for reflecting an optical signal inputted from any of the plurality of input/output ports toward another of the input/output ports. Preferably, the optical member is disposed displaceable so as to move an output point of the optical signal into a direction along an aligning direction of the plurality of input/output ports. Preferably, the optical member is disposed displaceable so as to move the output point of the optical signal into a direction intersecting the aligning direction of the plurality of input/output ports.

When switching between input/output paths of input/output ports, the optical member is initially displaced so as to move the output point of the optical signal into a direction intersecting the aligning direction of the plurality of input/output ports. Subsequently, the optical member is displaced so as to move the output point of the optical signal into a direction along the aligning direction of the plurality of input/output ports. Thereafter, the optical member is displaced so as to move the output point of the optical signal into the direction intersecting the aligning direction of the plurality of input/output ports. Thus, the output point of the optical signal is removed from the aligning direction of the plurality of input/output ports, moved into a direction along the aligning direction of the plurality of input/output ports, and then returned into the aligning direction of the plurality of input/output ports. This prevents the optical signal reflected by the optical member from traversing other input/output ports which are not subjected to switching. Hence, the light leaking to the other input/output ports is reduced, whereby influences on optical signals passing therethrough can be alleviated.

Preferably, the optical switching device further comprises an optical demultiplexer device for demultiplexing a wavelength division multiplexing optical signal into individual wavelengths. Preferably, the switching means comprises a plurality of optical members corresponding to respective signal light components demultiplexed into the individual wavelengths. This allows the optical switching device to be used as a wavelength-selective switch, whereby an optical ADM (Add Drop Multiplexer) for adding/or dropping a signal having a given wavelength to/from a wavelength-division-multiplexed optical signal and the like can be realized in a simple configuration.

Preferably, the switching means comprises a substrate, and a cantilever for supporting the optical member over the substrate. Preferably, the optical member is disposed so as to be able to tilt from side to side about an axis of the cantilever. Preferably, the cantilever is disposed flexible toward the substrate. This can simplify the structure of the switching means.

Preferably, the switching means comprises a first electrode, disposed on the substrate, for tilting the optical member about the axis of the cantilever; and a second electrode, disposed on the substrate, for flexing the cantilever toward the substrate. This allows the optical member to be displaced by an electrostatic force, so that substantially no current is required to flow, whereby power can be saved.

Preferably, the time required for switching between input/output paths of input/output ports is 10 ms or less. This makes it less likely for light to leak into other input/output ports which are not subjected to switching, whereby influences on optical signals passing therethrough can further be alleviated.

Preferably, when switching between input/output paths of input/output ports, crosstalk to the other input/output ports is −25 dB or better. In this case, there are substantially no influences on optical signals passing through other input/output ports which are not subjected to switching.

The optical transmission system in accordance with the present invention comprises the above-mentioned optical switching device. As mentioned above, when switching between input/output optical paths of input/output optical ports in the optical switching device, influences on optical signals passing through other input/output ports which are not subjected to switching can be alleviated.

The switching means in accordance with the present invention comprises a substrate, an optical member for reflecting light inputted, and a cantilever for supporting the optical member over the substrate. The optical member is disposed so as to be able to tilt from side to side about an axis of the cantilever. The cantilever is disposed flexible toward the substrate.

The present invention will become more fully understood from the detailed description given hereinbelow and the accompanying drawings. They are given by way of illustration only, and thus should not be considered limitative of the present invention.

DETAILED DESCRIPTION OF THE PREFERRED EMBODIMENTS

In the following, preferred embodiments of the optical switching device and optical transmission system in accordance with the present invention will be explained with reference to the drawings.

Figure 1:
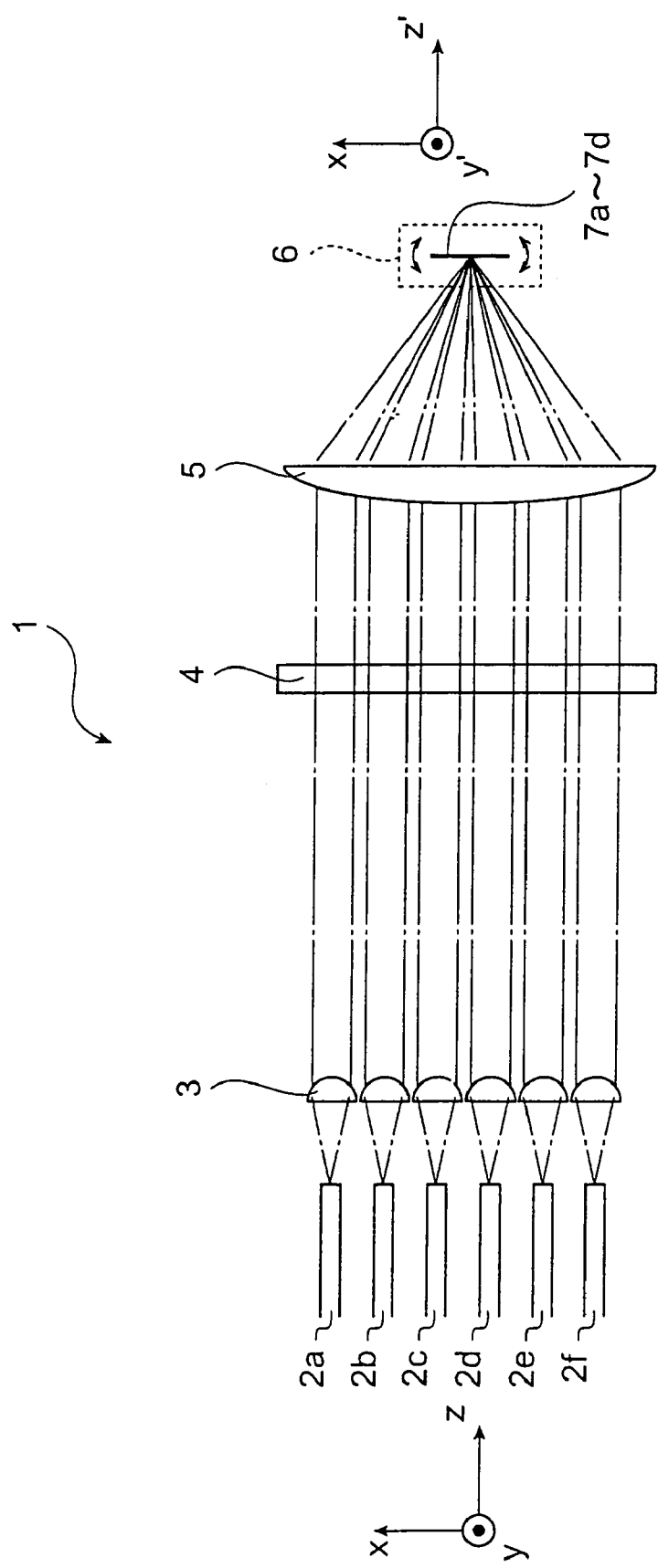
FIG. 1 is a schematic diagram of the optical switching device in accordance with an embodiment of the present invention as seen in y- and y'-axis directions.
Figure 2:
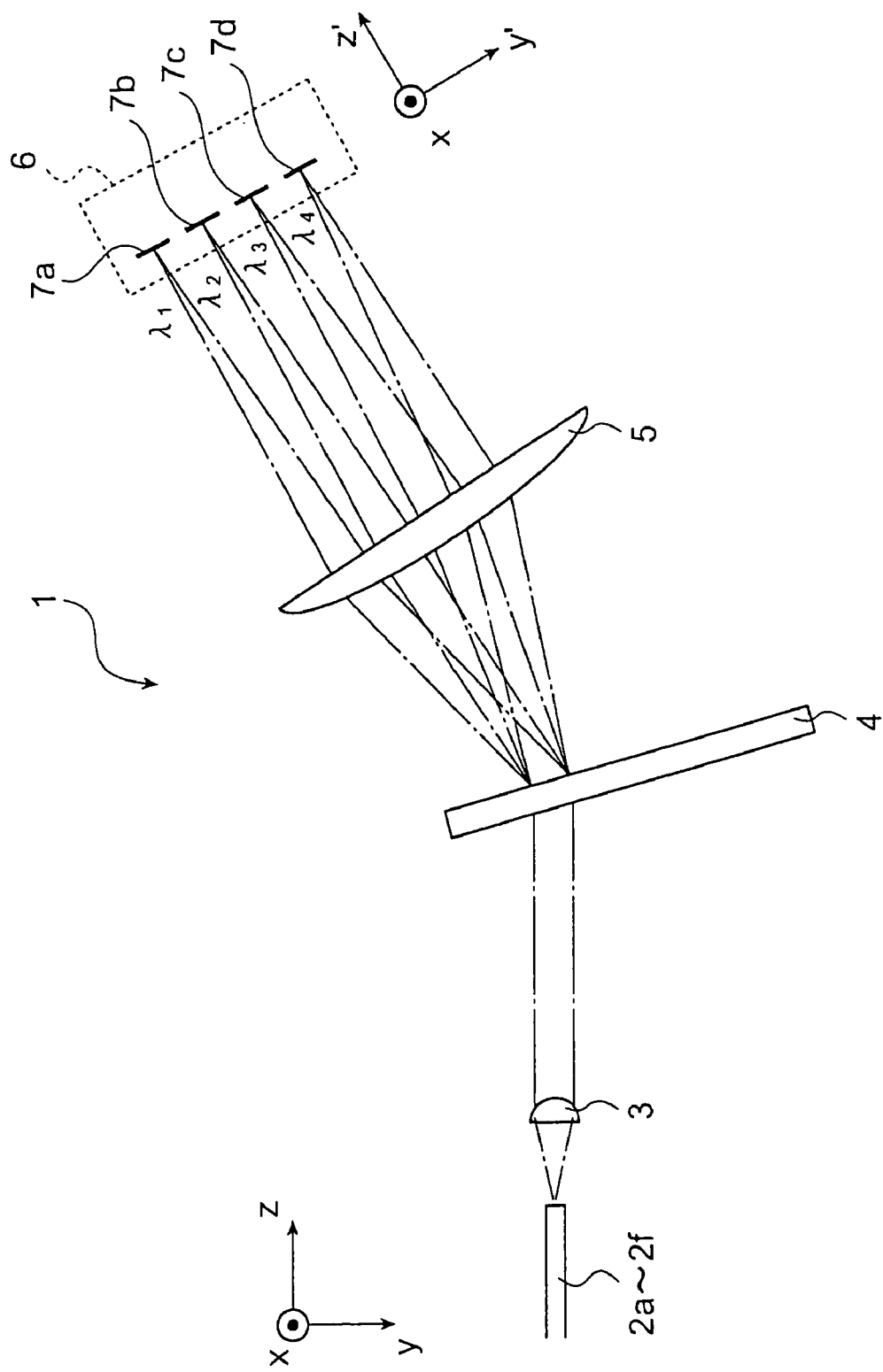
FIG. 2 is a schematic diagram of the optical switching device in accordance with the above-mentioned embodiment of the present invention as seen in the x-axis direction.

FIGS. 1 and 2 are schematic diagrams showing the optical switching device in accordance with an embodiment of the present invention. For convenience of explanation, an xyz orthogonal coordinate system and an xy'z' orthogonal coordinate system are shown in each of the drawings. FIG. 1 is a view showing the optical switching device in y- and y'-axis directions, whereas FIG. 2 is a view showing the optical switching device in the x-axis direction.

In each diagram, the optical switching device 1 in accordance with this embodiment comprises a plurality of input/output optical fibers 2a to 2f, an array lens 3, a diffraction grating 4, a lens 5, and an optical switch array 6. The xyz orthogonal coordinate system is used in the optical system between the input/output optical fibers 2a to 2f and the diffraction grating 4, whereas the xy'z' orthogonal coordinate system is used in the optical system between the diffraction grating device 4 and the optical switch array 6.

The input/output optical fibers 2a to 2f are input/output ports for inputting/outputting an optical signal (wavelength division multiplexing optical signal) in which four wavelengths $\lambda_1$ to $\lambda_4$, for example, are multiplexed, and are arranged in parallel with the z-axis direction. The input/output optical fiber 2c is used as a common entrance port, whereas the input/output optical fiber 2d is used as a common exit port. The input/output optical fibers 2a, 2e are used as Add ports, whereas the input/output optical fibers 2b, 2f are used as Drop ports.

The array lens 3 collimates optical signals inputted from the input/output optical fibers 2a, 2c, 2e and outputs thus collimated optical signals to the diffraction grating 4, and converges optical signals from the diffraction grating 4 and outputs thus converged optical signals to the input/output optical fibers 2b, 2d, 2f.

The diffraction grating 4 diffracts the wavelength division multiplexing signal light from the array lens 3 at respective diffraction angles corresponding to the wavelengths $\lambda_1$ to $\lambda_4$, so as to demultiplex the wavelength division multiplexing signal light into the wavelengths $\lambda_1$ to $\lambda_4$, and outputs thus demultiplexed optical signals to the lens 5. Though the depicted diffraction grating 4 is of transmission type, diffraction gratings of reflection type may also be used.

The lens 5 converges the respective optical signals having wavelengths of $\lambda_1$ to $\lambda_4$ demultiplexed by the diffraction grating 4 and outputs thus converged optical signals to the optical switch array 6, and collimates optical signals from the optical switch array 6 and outputs thus collimated optical signals to the diffraction grating 4.

The optical switch array 6 comprises movable mirrors 7a to 7d (which may collectively be referred to as a movable mirror 7 hereinafter) for reflecting the respective optical signals having the wavelengths of $\lambda_1$ to $\lambda_4$ converged by the lens 5, and switches between input/output optical paths of the input/output optical fibers 2a to 2f.

Figure 3:
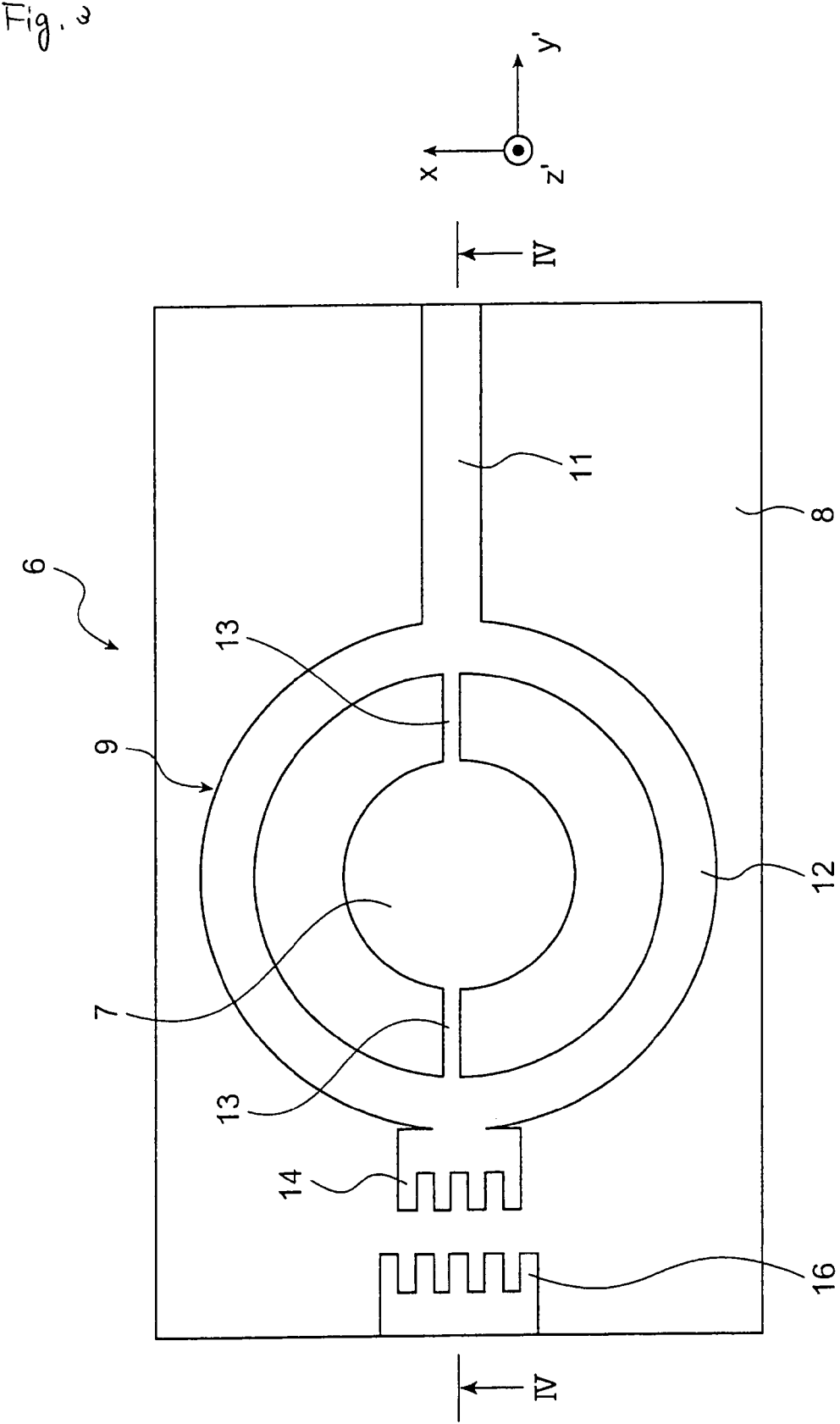
FIG. 3 is a plan view showing a part of the optical switch array shown in FIGS. 1 and 2.
Figure 4:
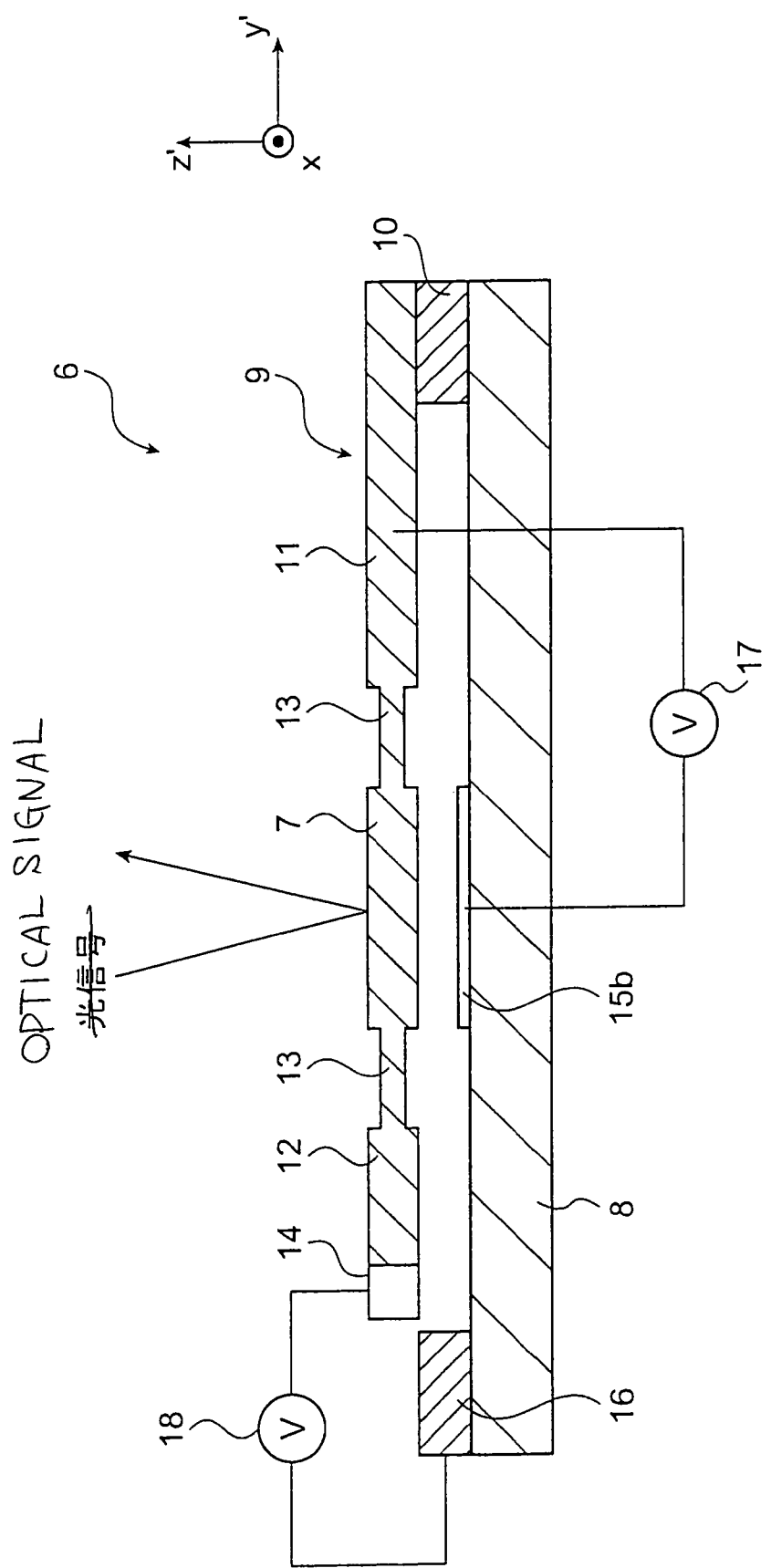
FIG. 4 is a sectional view taken along the line IV—IV of FIG. 3.

FIG. 3 is a plan view showing a part of the optical switch array 6, whereas FIG. 4 is a sectional view taken along the line IV—IV of FIG. 3. In each of these drawings, the optical switch array 6 comprises a substrate 8 made of Si or the like, and a plurality of actuator parts 9 formed on the substrate 8 by using a microelectromechanical systems (MEMS) technology.

Each actuator part 9 comprises a cantilever 11, one end of which is supported in a cantilever fashion on the upper face of the substrate 8 by way of a spacer 10, whereas an annular support 12 is provided in a part of the cantilever 11 on the leading end side. The annular support 12 supports the movable mirror 7 by way of hinges 13 on both sides thereof. As such, the movable mirror 7 is supported by the cantilever 11 by way of the annular support 12 and hinges 13. The hinges 13 extend longitudinally of the cantilever 11, whereby the movable mirror 7 can tilt from side to side about the axis of the cantilever 11 (see FIGS. 6A, 6B, and 6C). The leading end of the cantilever 11 is provided with a comb part 14.

Figure 5:
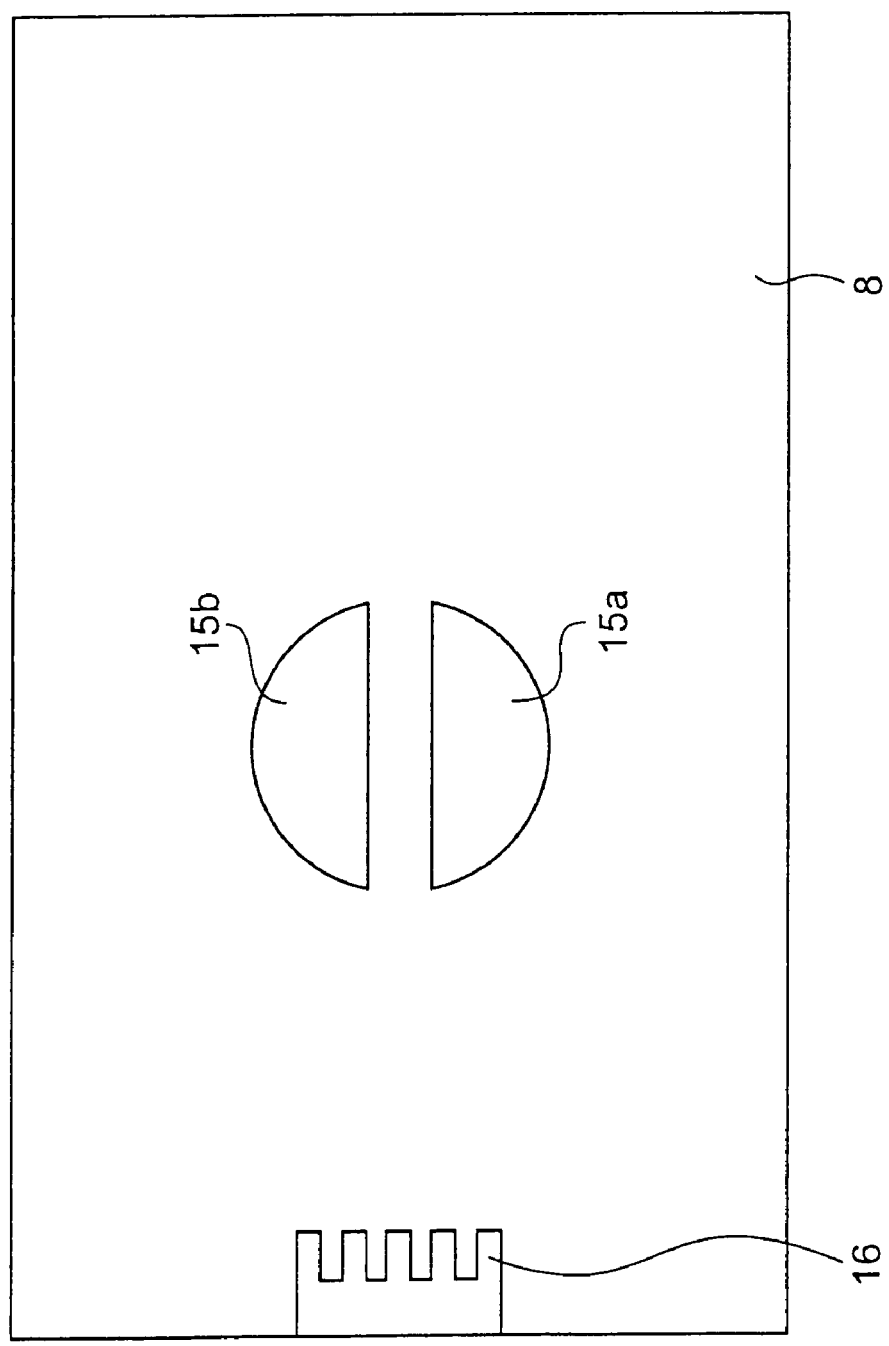
FIG. 5 is a plan view of the substrate shown in FIG. 3.

At a location opposing the movable mirror 7, the upper face of the substrate 8 is provided with a pair of substantially semicircular electrodes 15a, 15b for tilting the movable mirror 7 about the axis of the cantilever 11 as shown in FIG. 5. At a location in the vicinity of the comb part 14, the upper face of the substrate 8 is provided with a comb-shaped electrode 16 for flexing the cantilever 11 toward the substrate 8.

Such an actuator part 9 is formed from electrically conductive Si, for example. The reflecting surface of the movable mirror 7 is coated with Au, for example, in order to reflect substantially all the light from the lens 5.

The cantilever 11 is connected to the electrodes 15a, 15b by way of a voltage source 17. When the voltage source 17 supplies a voltage to the electrodes 15a, 15b, an electrostatic force is generated between the movable mirror 7 and the electrodes 15a, 15b, so as to tilt the movable mirror 7 about the axis of the cantilever 11.

Figure 6:
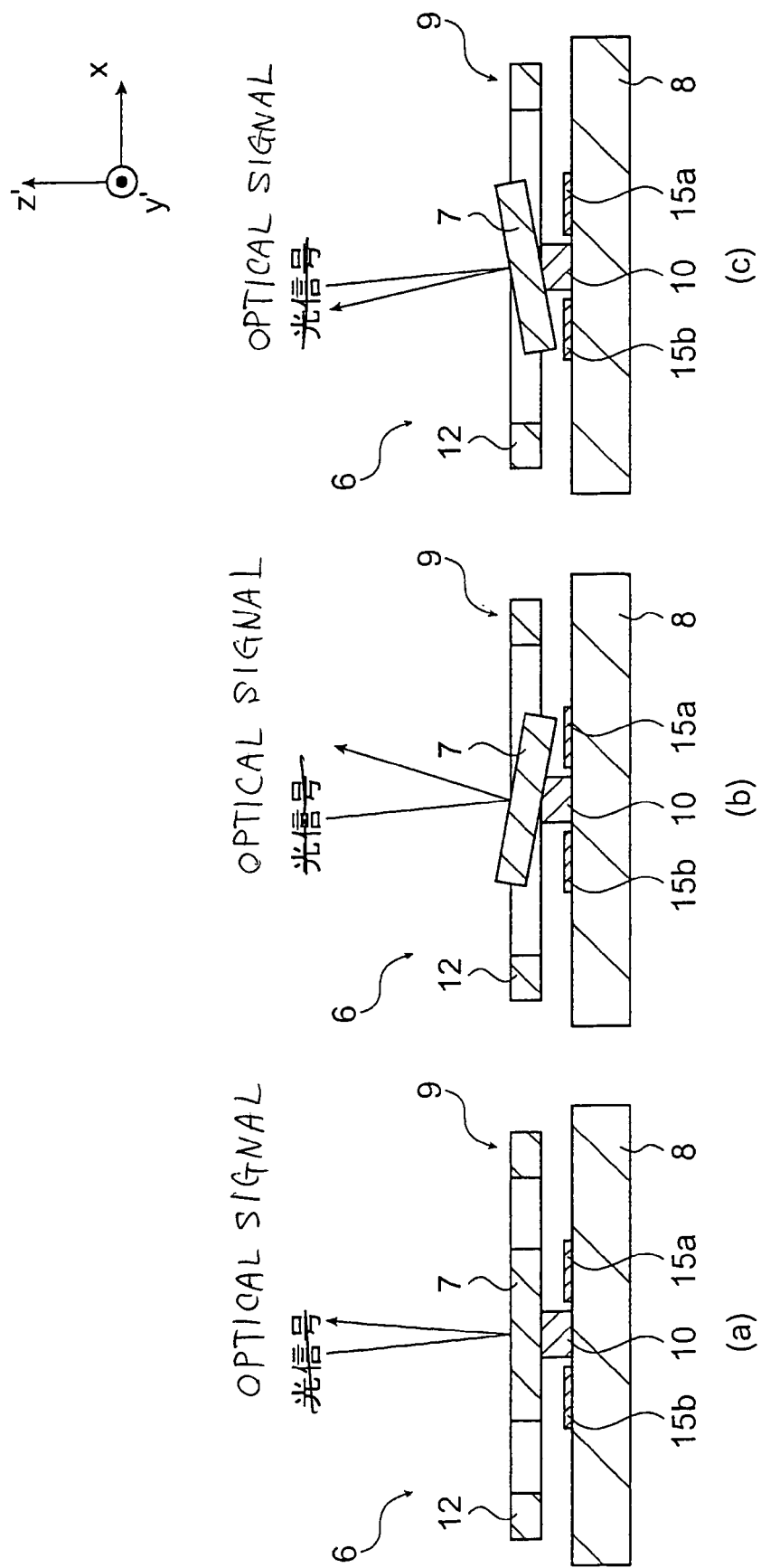
FIGS. 6A, 6B, and 6C are sectional views showing states where a movable mirror is tilted about an axis of a cantilever.

When the voltage applied to the electrodes 15a, 15b is zero, the movable mirror 7 is parallel to the annular support 12 as shown in FIG. 6A. In this state, the movable mirror 7 reflects the optical signal from the input/output optical fiber (common entrance port) 2c toward the input/output optical fiber (common exit port) 2d.

When a predetermined voltage is applied to the electrode 15a, an electrostatic force generated between the movable mirror 7 and the electrode 15a attracts a part of the movable mirror 7 on the electrode 15a side toward the electrode 15a, whereby the movable mirror 7 tilts about the axis of the cantilever 11 as shown in FIG. 6B. In this state, the movable mirror 7 outputs the optical signal from the input/output optical fiber (common entrance port) 2c toward the input/output optical fiber (Drop port) 2f.

When a predetermined voltage is applied to the electrode 15b, an electrostatic force generated between the movable mirror 7 and the electrode 15b attracts a part of the movable mirror 7 on the electrode 15b side toward the electrode 15b, whereby the movable mirror 7 tilts about the axis of the cantilever 11 as shown in FIG. 6C in the direction opposite from that in the case of FIG. 6B. In this state, the movable mirror 7 outputs the optical signal from the input/output optical fiber (common entrance port) 2c toward the input/output optical fiber (Drop port) 2b.

The cantilever 11 and the electrode 16 are connected to each other by way of a voltage source 18. The voltage source 18 supplies a voltage to the electrode 16, so as to generate an electrostatic force between the comb part 14 and the electrode 16, thereby flexing a part of the cantilever 11 on the leading end side downward so that this part approaches the substrate 8.

When the voltage applied to the electrode 16 is zero, the cantilever 11 is straight as shown in FIG. 4. In this state, the movable mirror 7 is at a normal position for reflecting the optical signals led from the input/output optical fibers 2a, 2c, 2e by way of the array lens 3, diffraction grating 4, and lens 5 toward the input/output optical fibers 2b, 2d, 2f by way of the lens 5, diffraction grating 4, and array lens 3.

Figure 7:
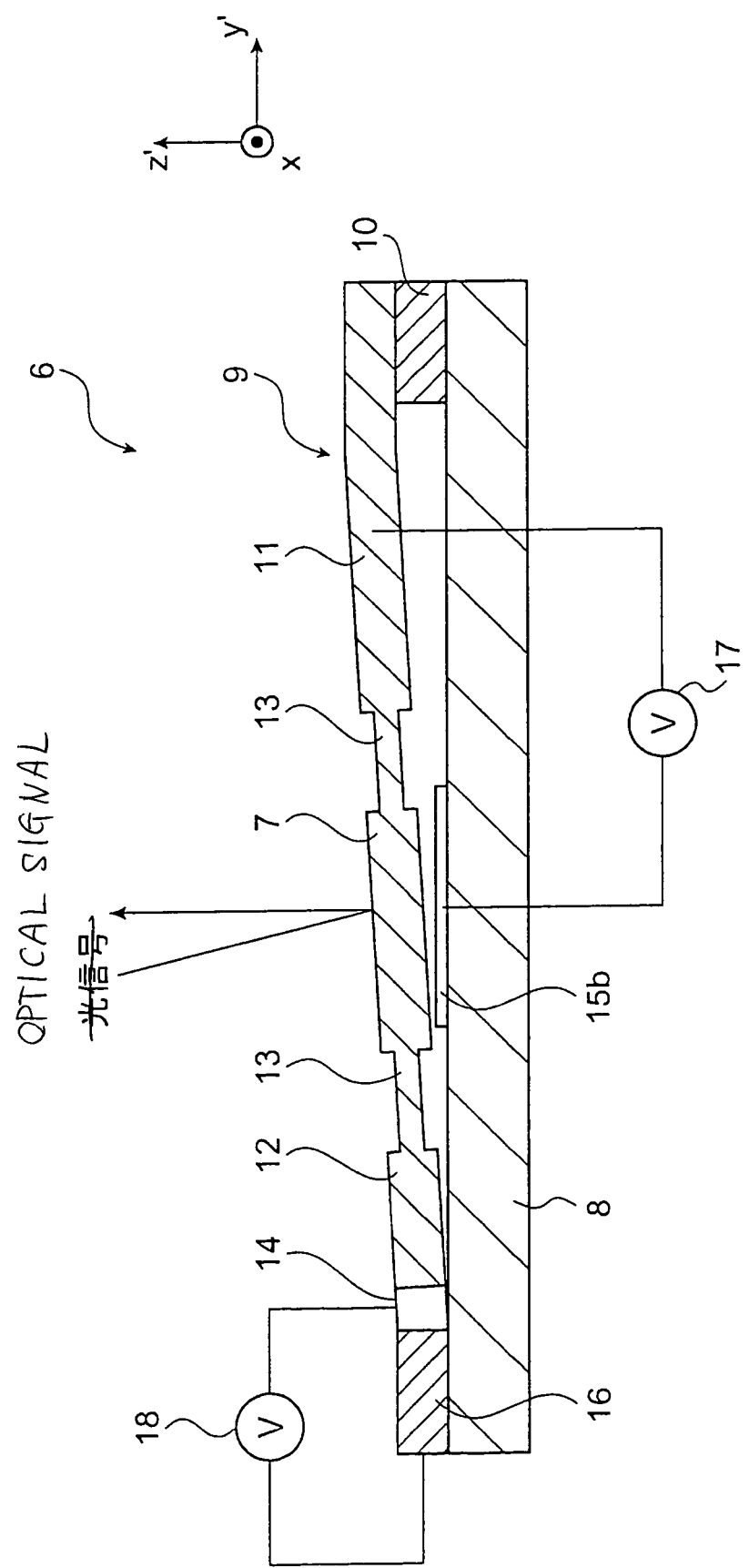
FIG. 7 is a sectional view showing a state where the cantilever is flexed toward the substrate so as to displace the movable mirror.

When a predetermined pulse voltage is applied to the electrode 16, on the other hand, an electrostatic force generated between the comb part 14 and the electrode 16 attracts the comb part 14 toward the electrode 16, so that a part of the cantilever 11 on the leading end side flexes downward, thereby displacing the movable mirror 7 as shown in FIG. 7. As a consequence, the movable mirror 7 moves to a shunt position for reflecting the optical signals led from the input/output optical fibers 2a, 2c, 2e by way of the array lens 3, diffraction grating 4, and lens 5 away from the input/output optical fibers 2b, 2d, 2f. As a result, output points of the optical signals are moved into a direction intersecting the aligning direction of the input/output optical fibers 2a to 2f.

Operations of thus configured optical switching device 1 will now be explained. The wavelength division multiplexing optical signal inputted from the input/output optical fiber (common entrance port) 2c is collimated by the array lens 3, so as to be made incident on the diffraction grating 4, by which the optical signal is demultiplexed into the individual wavelengths $\lambda_1$ to $\lambda_4$. The respective optical signals having the wavelengths $\lambda_1$ to $\lambda_4$ are reflected by the movable mirrors 7a to 7d of the optical switch array 6 while in a state converged by the lens 5.

When the voltage applied from the voltage sources 17, 18 to the optical switch array 6 is zero here, the movable mirrors 7a to 7d are at the normal position (posture) as shown in FIG. 4, whereby their angle of inclination is zero degree as shown in FIG. 6A.

In this case, the respective optical signals reflected by the movable mirrors 7a to 7d are made incident on the diffraction grating 4 and multiplexed thereby while in a state collimated by the lens 5. Thus multiplexed optical signal is outputted from the input/output optical fiber (common exit port) 2d while in a state converged by the array lens 3. As a consequence, the wavelength division multiplexing optical signal inputted from the input/output optical fiber 2c is outputted as it is from the input/output optical fiber 2d at the time of power failure.

When wavelength switching is effected here so as to make the input/output optical fiber (Drop port) 2b output only the optical signal having the wavelength $\lambda_4$ in the wavelength division multiplexing optical signal inputted from the input/output optical fiber 2c, for example, the voltage source 18 initially applies a pulse voltage to the electrode 16 in the actuator part 9 having the movable mirror 7d for reflecting the optical signal having the wavelength $\lambda_4$. Consequently, as shown in FIG. 7, the leading end side of the cantilever 11 in the actuator part 9 flexes downward, whereby the movable mirror 7d shifts from the normal position to the shunt position. This moves the output point of the optical signal into a direction intersecting the aligning direction of the input/output optical fibers 2a to 2f, whereby the optical axis of the optical signal having the wavelength $\lambda_4$ reflected by the movable mirror 7d deviates from the respective optical axes of the optical signals having the wavelengths $\lambda_1$ to $\lambda_3$ reflected by the movable mirrors 7a, 7b, 7c. Therefore, the optical signal having the wavelength $\lambda_4$ reflected by the movable mirror 7d is not made incident on the lens 5, and thus does not reach the input/output optical fiber 2d.

In this state, the voltage source 17 applies a predetermined voltage to the electrode 15b in the actuator part 9 having the movable mirror 7d, so as to tilt the movable mirror 7d in the direction shown in FIG. 6C, thereby moving the output point of the optical signal having the wavelength $\lambda_4$ into a direction along the aligning direction of the input/output optical fibers 2a to 2f, thus choosing the input/output optical fiber 2b as an output port for the optical signal having the wavelength $\lambda_4$.

Subsequently, the voltage applied to the electrode 16 is set to zero. As a consequence, the cantilever 11 resumes its initial state as shown in FIG. 4 because of its urging force, whereby the movable mirror 7d returns from the shunt position to the normal position. As a result, the optical signal having the wavelength $\lambda_4$ reflected by the movable mirror 7d is outputted from the input/output optical fiber 2b while in a state collimated by the lens 5, diffracted by the diffraction grating 4, and converged by the array lens 3.

When the actuator part 9 lacks the comb part 14, electrode 16, and voltage source 18, the movable mirror 7d tilts while being held at the normal position shown in FIG. 4 in the above-mentioned wavelength switching. Namely, while the optical signal having the wavelength $\lambda_4$ reflected by the movable mirror 7d is incident on the input/output optical fiber 2d, the output optical path of the optical signal having the wavelength $\lambda_4$ is switched from the input/output optical fiber 2d to the input/output optical fiber 2b.

In this case, the optical signal having the wavelength $\lambda_4$ reflected by the movable mirror 7d traverses the input/output optical fiber (common entrance port) 2c between the input/output optical fibers 2d, 2b, whereby an unnecessary optical signal may enter the input/output optical fiber 2c. This may affect the optical signal passing through the input/output optical fiber 2c, thereby remarkably deteriorating the transmission quality.

In this embodiment, by contrast, the movable mirror is shifted from the normal position shown in FIG. 4 to the shunt position shown in FIG. 7, and the movable mirror 7d is tilted about the axis of the cantilever 11 in this state. As a consequence, the optical signal having the wavelength $\lambda_4$ reflected by the movable mirror 7d does not traverse the input/output optical fiber 2c when switching the output optical path from the input/output optical fiber 2d to the input/output optical fiber 2b. Therefore, unnecessary light hardly leaks into the input/output optical fiber 2c, whereby the optical signal passing through the input/output optical fiber 2c can be prevented from deteriorating.

In order to prevent light from leaking into the input/output optical fiber 2c more reliably, it is preferred that the time required for switching between input/output optical paths be 10 ms or less. When switching between input/output paths, it is preferred that the intensity of the optical signal leaking to the input/output optical fiber 2c (crosstalk to the input/output optical fiber 2c) be −25 dB or better.

Figure 8:
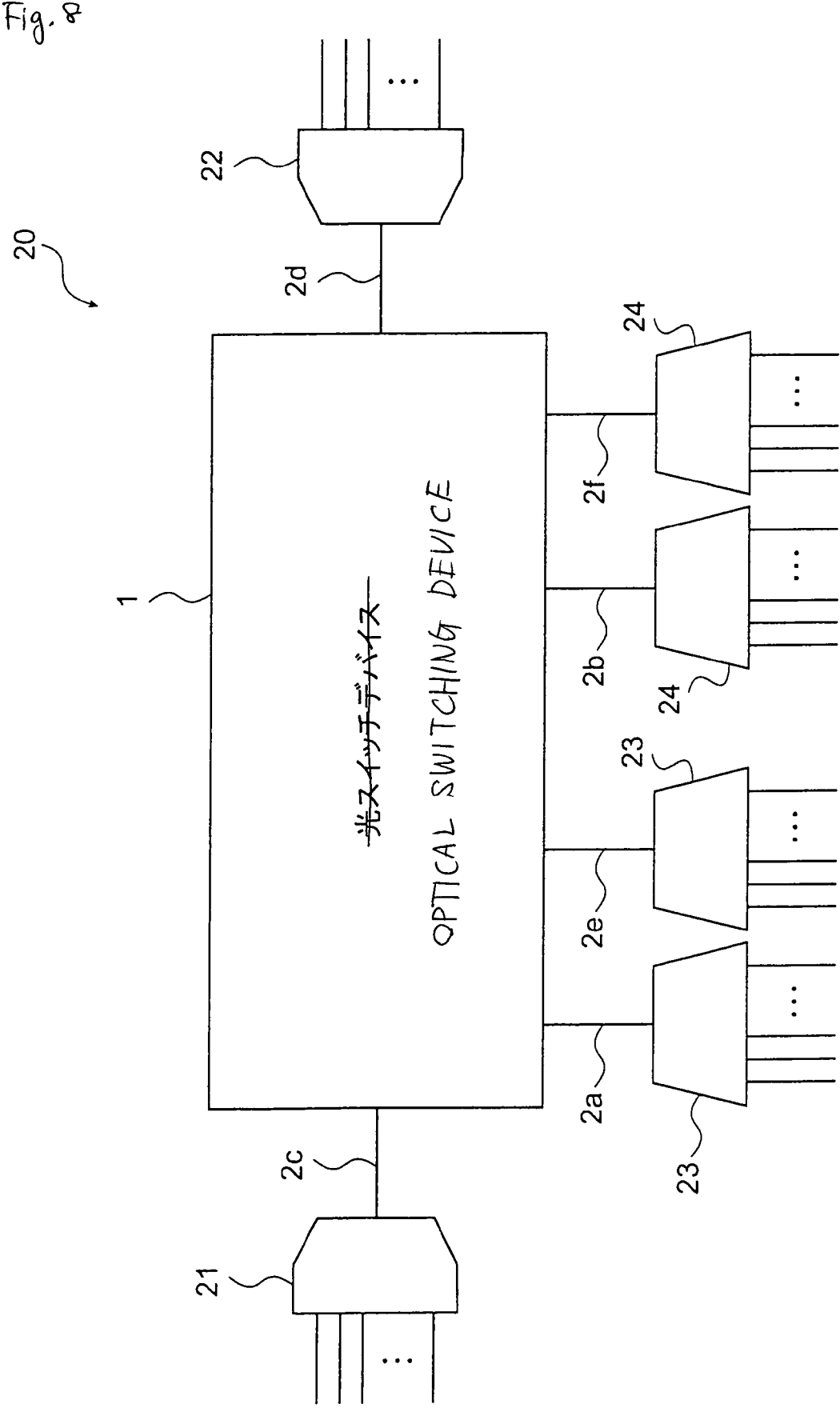
FIG. 8 is a diagram showing an optical ADM as an example of optical transmission system equipped with the optical switching device shown in FIGS. 1 and 2.

FIG. 8 shows the configuration of an optical ADM as an example of optical transmission system comprising the above-mentioned optical switching device 1.

The optical ADM 20 shown in this drawing comprises the above-mentioned optical switching device 1. A multiplexer 21 is connected to the input/output optical fiber 2c of the optical switching device 1. A demultiplexer 22 is connected to the input/output optical fiber 2d of the optical switching device 1. The multiplexer 21 combines respective optical signals having individual wavelengths, and leads thus multiplexed signals into one input/output optical fiber 2c. The demultiplexer 22 demultiplexes a plurality of optical signals having different wavelengths propagated through one input/output optical fiber 2d into the individual wavelengths. Multiplexers 23 for adding are connected to the input/output optical fibers 2a, 2e of the optical switching device 1, respectively. Demultiplexers 24 for dropping are connected to the input/output optical fibers 2b, 2f of the optical switching device 1, respectively.

Providing the optical switching device 1 as such makes it unnecessary to construct an optical ADM by using numerous m×n optical switches. This allows the optical ADM to become smaller, simpler, and less expensive.

The present invention is not restricted to the above-mentioned embodiments. For example, though a mirror is used as an optical member for reflecting optical signals from the lens 5 in the above-mentioned embodiments, a prism may be used in place of the mirror.

Though the substrate 8 is provided with the electrodes 15a, 15b, 16 so that the movable mirror 7 is driven by electrostatic forces in the above-mentioned embodiments, electromagnetic forces may be used for driving the movable mirror 7.

Though a plurality of input/output ports for inputting/outputting optical signals are constituted by optical fibers in the above-mentioned embodiments, they may be constructed by planar waveguides as well.

Though the above-mentioned embodiments employ the optical switching device in an optical ADM, the optical switching device of the present invention can be employed for optical multi/demultiplexers as well. The optical switching device of the present invention is applicable not only to wavelength-selective switches, but also to others as long as they are adapted to switch between input/output paths of input/output ports.

From the foregoing explanations of the invention, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical switching device comprising:
a plurality of input/output ports for inputting/outputting optical signals;
a switch positioned in an optical path between a first input/output port and second input/output port of said input/output ports, the switch comprising:
a reflective optical member;
a substrate;
a cantilever opposing the substrate and having a first end fixed thereto, a second end separated from the substrate, and a portion intermediate the first and second ends supporting the optical member;
wherein the switch is configured to switch the optical path from the second input/output port to a third input/output port of said input/output ports while precluding an optical signal in the optical path from traversing the remaining input/output ports; and wherein the switch further comprises:
a first electrode, disposed on the substrate, for tilting the optical member about the axis of the cantilever; and
a second electrode, disposed on the substrate, for flexing the cantilever toward the substrate.

2. An optical switching device according to claim 1, wherein the optical member is disposed displaceable so as to move an output point of the optical signal into a direction along an aligning direction of the plurality of input/output ports; and
wherein the optical member is disposed displaceable so as to move the output point of the optical signal into a direction intersecting the aligning direction of the plurality of input/output ports.

3. An optical switching device according to claim 1, further comprising an optical demultiplexer device for demultiplexing a wavelength division multiplexing optical signal into individual wavelengths; and
wherein the switch comprises a plurality of reflective optical members corresponding to respective signal light components demultiplexed into the individual wavelengths.

4. An optical transmission system comprising the optical switching device according to claim 1.

5. An optical switching device according to claim 3, further comprising a plurality of cantilevers corresponding, respectively, to the plurality of reflective optical members.

6. An optical switch comprising:
a substrate;
an optical member for reflecting light inputted;
a cantilever supporting the optical member over the substrate, the cantilever having a first end fixed to the substrate and a distal end free of the substrate, the first end and distal end defining a cantilever axis;
wherein the optical member is disposed so as to be able to tilt about the axis of the cantilever;
the distal end of the cantilever is configured for displacement in a direction orthogonal to the axis of the cantilever; and wherein the optical member is supported by the cantilever at a portion thereof intermediate the first end and the distal end, and further comprising:
a first electrode, disposed on the substrate proximate the intermediate portion of the cantilever, for tilting the optical member about the axis of the cantilever; and
a second electrode, disposed on the substrate proximate the distal end, for displacing the distal end of the cantilever toward the substrate.

7. In an optical switching arrangement comprising a switch as recited in claim 6, and a plurality of aligned input and output ports, a method for switching an optical signal path from a first output port to a second output port comprising the steps of:
diverting the optical signal path in a direction out of alignment with the ports;
deflecting the optical signal path by an angle corresponding to a position of the second output port while maintaining the optical signal path out of alignment with the ports; and
directing the optical signal path into alignment with the ports to complete the signal path to the second output port;
wherein the optical signal in the signal path is precluded from traversing any of the remaining ports of the plurality of ports.

8. A method as recited in claim 7, wherein the diverting step comprises
applying the optical signal to a reflective member; and
changing the angle of reflection of the optical signal from the reflective member in a plane transverse to the alignment direction of the plurality of ports.

9. A method as recited in claim 7, wherein the deflecting step comprises:
applying the optical signal to a reflective member; and
rotating the reflective member about an axis that is transverse to a plane of alignment of the plurality of ports.

* * * * *